US009580971B2

(12) United States Patent
McNease

(10) Patent No.: US 9,580,971 B2
(45) Date of Patent: Feb. 28, 2017

(54) COATED APPARATUS FOR IMPROVED CORROSION RESISTANCE AND ASSOCIATED SYSTEM AND METHOD FOR ARTIFICIAL LIFT

(71) Applicant: BCM Production Services, LLC, Lake Charles, LA (US)

(72) Inventor: Larry Lance McNease, Lake Charles, LA (US)

(73) Assignee: BCM Production, LLC, Lake Charles, LA (US)

( * ) Notice: Subject to any disclaimer, the term of this patent is extended or adjusted under 35 U.S.C. 154(b) by 0 days.

(21) Appl. No.: 14/799,301

(22) Filed: Jul. 14, 2015

(65) Prior Publication Data

US 2017/0016282 A1     Jan. 19, 2017

(51) Int. Cl.
*E21B 17/00* (2006.01)
*E21B 43/12* (2006.01)
*B32B 15/01* (2006.01)
*C22C 18/04* (2006.01)

(52) U.S. Cl.
CPC ............ *E21B 17/00* (2013.01); *B32B 15/011* (2013.01); *B32B 15/012* (2013.01); *B32B 15/013* (2013.01); *B32B 15/015* (2013.01); *C22C 18/04* (2013.01); *E21B 43/121* (2013.01)

(58) Field of Classification Search
CPC ...... E21B 17/00; E21B 43/121; B32B 15/015
See application file for complete search history.

(56) References Cited

U.S. PATENT DOCUMENTS

| | | | |
|---|---|---|---|
| 2003/0035895 A1* | 2/2003 | Bianchi | C23C 4/08 427/307 |
| 2003/0196732 A1* | 10/2003 | Carey, II | B32B 15/01 148/537 |
| 2011/0220348 A1* | 9/2011 | Jin | E21B 17/042 166/244.1 |
| 2014/0102721 A1* | 4/2014 | Bespalov | E21B 33/072 166/385 |

* cited by examiner

*Primary Examiner* — Giovanna C Wright
*Assistant Examiner* — Kristyn Hall
(74) *Attorney, Agent, or Firm* — Hulsey P.C.

(57) ABSTRACT

Embodiments provide a coated apparatus for improved corrosion resistance and associated system and system and method for artificial lift.

20 Claims, 4 Drawing Sheets

COATED APPARATUS FOR IMPROVED CORROSION RESISTANCE AND ASSOCIATED SYSTEM AND METHOD FOR ARTIFICIAL LIFT

CROSS-REFERENCE TO RELATED APPLICATIONS

N/A

FIELD OF THE INVENTION

The present disclosure relates to an apparatus, more specifically a coated apparatus for improved corrosion resistance. Embodiments relate to a coated apparatus, a system, and a system and method for artificial lift and/or natural flow.

BACKGROUND OF THE INVENTION

The disclosed subject matter provides an apparatus. The apparatus may comprise a coating for improved corrosion resistance. In an underground environment, the apparatus may be provided corrosion resistance via the coating which may comprise zinc, aluminum, lead, iron, copper, and cadmium. Embodiments relate to a coated apparatus, a system, and a system and method for artificial lift and/or natural flow.

BRIEF SUMMARY OF THE INVENTION

The disclosed subject matter provides an apparatus. The apparatus may have a high corrosion resistance in a high radical concentration underground environment. The apparatus may comprise a first end, a second end, a carbon steel core, and a coating adjacent a portion of the surface of the steel core. The coating may comprise zinc, aluminum, lead, iron, copper, and cadmium.

The disclosure may further provide a system that may comprise a well. The well may comprise a well casing comprising an interior surface and an exterior surface. A well tubing found within the casing may comprise an interior surface and an exterior surface. At least a portion of the exterior surface of the well tubing may comprise a coating comprising zinc, aluminum, lead, iron, copper, and cadmium. At least one sucker rod may extend within said well tubing. The at least one sucker rod may be affixed to a pump jack at the surface of the earth. The at least one sucker rod may comprise a first end, a second end, a carbon steel core, and the coating adjacent a portion of the surface of the core.

The disclosure may further provide a system for artificial lift. The artificial lift may comprise one or more components of the aforementioned system. The artificial lift may comprise a means of removing hydrocarbons from underneath the surface of the earth.

The disclosure may further provide a method for artificial lift. The method may comprise supporting in a well casing a number of components. One component may be a well tubing comprising an interior surface and an exterior surface. In embodiments, at least a portion of the exterior surface of the well tubing may comprise a coating comprising zinc, aluminum, lead, iron, copper, and cadmium. Another component may be at least one sucker rod that may extend within the well tubing. The at least one sucker rod may be affixed to a pump jack at the surface of the earth. The at least one sucker rod may comprise a first end, a second end, a carbon steel core, and the coating of zinc, aluminum, lead, iron, copper, and cadmium adjacent a portion of the surface of the steel core. The method may further comprise powering the pump jack so as to actuate the at least one sucker rod and allow the displacement of underground fluid. In embodiments, throughout one or more steps of the method, the coating on the well tubing and the coating on the sucker rod may protect the sucker rod, the interior surface of the tubing, the exterior surface of the tubing, and the interior surface of the casing from electrochemical corrosion during the displacement of the underground fluid.

BRIEF DESCRIPTION OF THE DRAWINGS

The novel features believed characteristic of the disclosed subject matter will be set forth in any claims that are filed. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
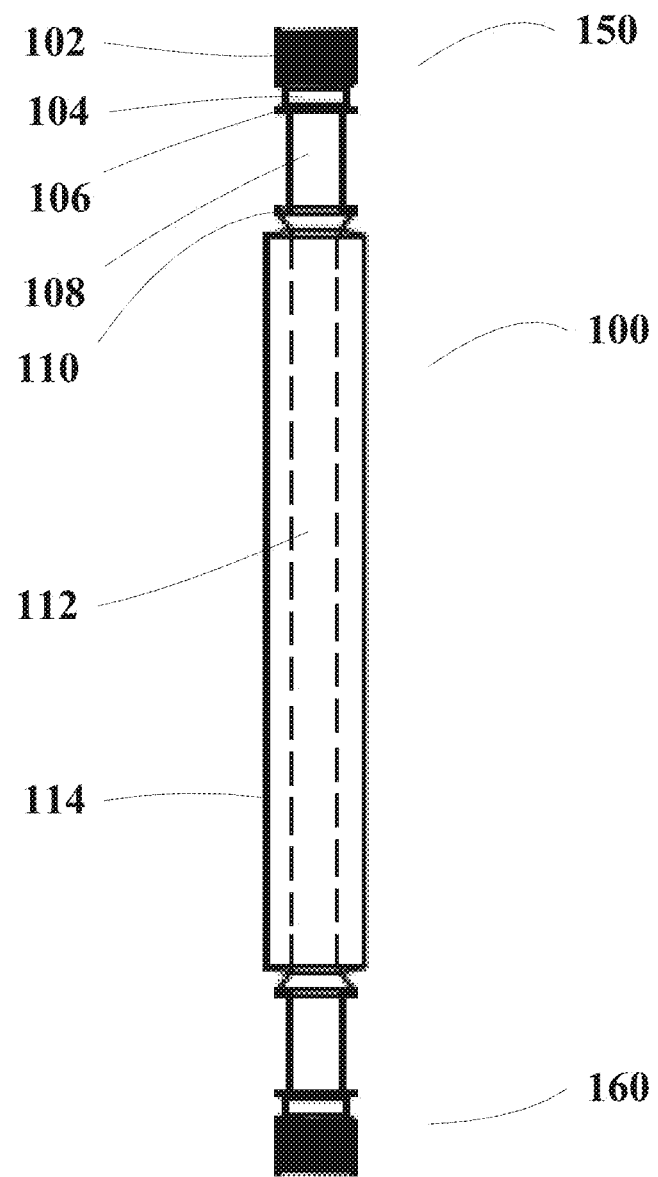
FIG. 1 displays a perspective view of a coated apparatus in accordance with embodiments.

FIG. 1 displays a perspective view of a coated apparatus 100 in accordance with embodiments. In embodiments, the apparatus 100 may be a sucker rod. In embodiments, the apparatus 100 may be a pony rod. The apparatus 100 may comprise a first end and a second end 150,160. The core 112 of the apparatus 100 may comprise a carbon steel. A portion of the surface of the core 112 may comprise a sucker rod coating 114 comprising a combination of zinc, aluminum, lead, iron, copper, and cadmium.

The first and second ends 150,160 of the apparatus 100 may comprise one or more components. The male thread joint 102 may be found at the ends of the first and second ends 150,160 of the apparatus 100. The male thread joint 102 may allow the apparatus 100 to be affixed to a component with a female thread joint. An unloading slot 104 may be found adjacent the male thread joint 102. The unloading slot 104 may be the portion of the apparatus 100 where a push bearing face shoulder 106 may be allowed to slide over the unloading slot 104 when the push bearing face shoulder 106 is engaged. A spanner square neck 108 may span the area between the push bearing face shoulder 106 and a flange 110. The flange 110 may provide strength to the apparatus 100 or may be used to affix the apparatus 100 to another component. The core 112 of the apparatus 100 may be adjacent the flange 110.

In order to apply a sucker rod coating 114 to the core 112 of the apparatus 100, in embodiments, the core 112 may be sand blasted, primed, and/or galvanized prior to being coated. This may allow for ideal affixation between the core 112 and the sucker rod coating 114 by removing any impurities that may exist on the surface of the core 112.

In embodiments, an interface may exist between the steel core 112 and the sucker rod coating 114, wherein the interface may be a product of molding a predetermined mixture of the sucker rod coating 114 in a predetermined volume to the carbon steel core 112. In embodiments, the thickness of the sucker rod coating 114 may be between 0.4375 inches and 0.5625 inches.

Figure 2:
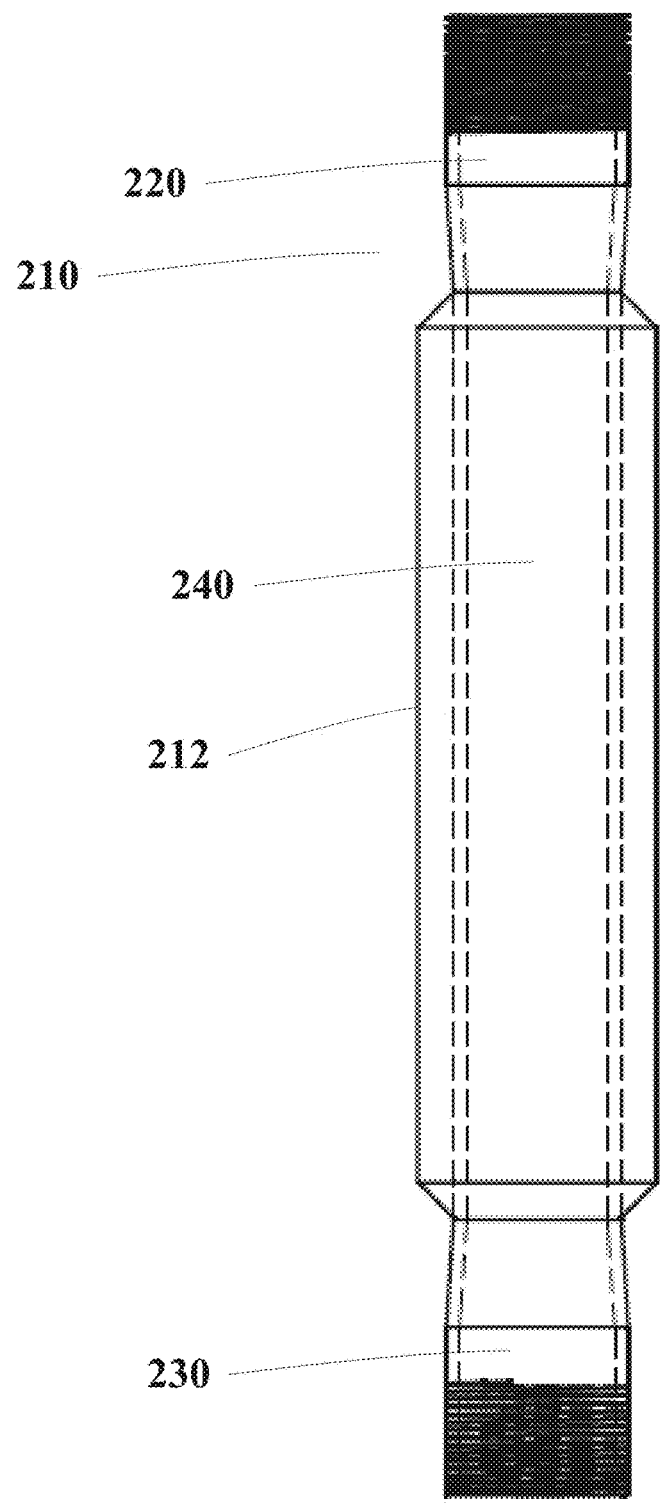
FIG. 2 displays a portion of tubing and coating in accordance with embodiments.

FIG. 2 displays a portion of tubing 210 and well tubing coating 212 in accordance with embodiments. The tubing may comprise a body 240, a first end 220, and a second end 230. The ends 220,230 may comprise affixing means to couple to another piece of tubing 210. In embodiments, the affixing means may be a male fastening element. The well tubing coating 212 may cover at least a portion of the body 240 of the tubing 210 and may taper on both ends at the conjoining area of the body 240 with the first and second ends 220,230. In embodiments, a tubing 210 with a well tubing coating 212 may be placed at 2000 feet in depth as part of a longer section of tubing 210 in a well 202.

In embodiments, the well tubing coating 212 found on the tubing 210 may comprise an inner diameter of 2.375 inches. In embodiments, the well tubing coating 212 found on the tubing 210 may comprise an outer diameter of 3.625 inches. In embodiments, the well tubing coating 212 found on the tubing 210 may comprise an inner diameter of 2.875 inches. In embodiments, the well tubing coating 212 found on the tubing 210 may comprise an outer diameter of 4.125 inches. In embodiments, the angle at which the well tubing coating 212 may converge with the tubing 210 may be 45 degrees. In embodiments, the length of the well tubing coating 212 from convergence point to convergence point may be 16.5 inches.

In embodiments, the sucker rod coating 114 found on the single apparatus 100, sucker rod 214, and/or pony rod may comprise an inner diameter of 0.75 inches. In embodiments, the sucker rod coating 114 found on the single apparatus 100, sucker rod 214, and/or pony rod may comprise an outer diameter of 1.75 inches. In embodiments, the sucker rod coating 114 found on the single apparatus 100, sucker rod 214, and/or pony rod may comprise an outer diameter of 1.625 inches. In embodiments, the sucker rod coating 114 found on the single apparatus 100, sucker rod 214, and/or pony rod may comprise an outer diameter of 1.875 inches. In embodiments, the sucker rod coating 114 found on the single apparatus 100, sucker rod 214, and/or pony rod may comprise an inner diameter of 0.875 inches. In embodiments, the sucker rod coating 114 found on the single apparatus 100, sucker rod 214, and/or pony rod may comprise an outer diameter of 1.75 inches. In embodiments, the sucker rod coating 114 found on the single apparatus 100, sucker rod 214, and/or pony rod may comprise an outer diameter of 1.875 inches. In embodiments, the sucker rod coating 114 found on the single apparatus 100, sucker rod 214, and/or pony rod may comprise an outer diameter of 2 inches.

Figure 3A:
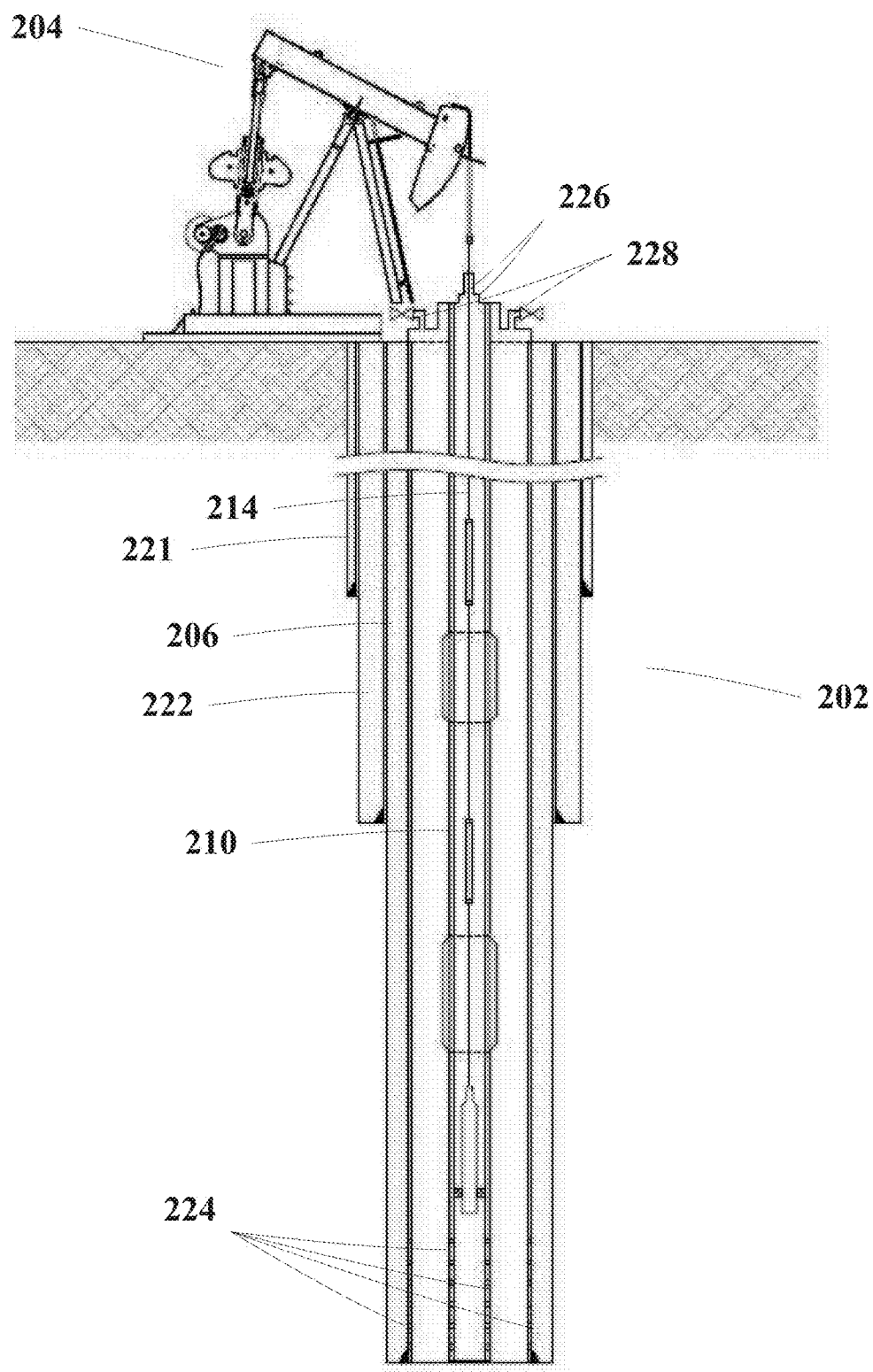
FIG. 3A displays a system that comprises a well in accordance with embodiments.

FIG. 3A displays a system that comprises a well 202 in accordance with embodiments. A sucker rod 214 with a sucker rod coating 114 may be found within the well 202 and may be affixed to a pump jack 204 that may be found at the surface of the earth. The well 202, in embodiments, may comprise three casings: a surface casing 221, an intermediate casing 222, and an inner well casing 206. Rod pump flow 226 may exit the well 202 at a point above the surface. For the purposes of this disclosure, the term "rod pump flow" may refer to any liquid and/or gas that may have been pumped out of the earth using the well 202. Natural flow 228 may also exit the well 202 at a point above the surface. For the purposes of this disclosure, the term "natural flow" may refer to any liquid and/or gas that may have exited the earth from the well 202 but that was not aided by a pump. In embodiments, the well may comprise hydrocarbons in liquid and/or gas form.

In embodiments, the inner well casing 206 and the tubing 210 may comprise perforations 224 that may allow liquids and/or gases to flow into and within the well 202.

Figure 3B:
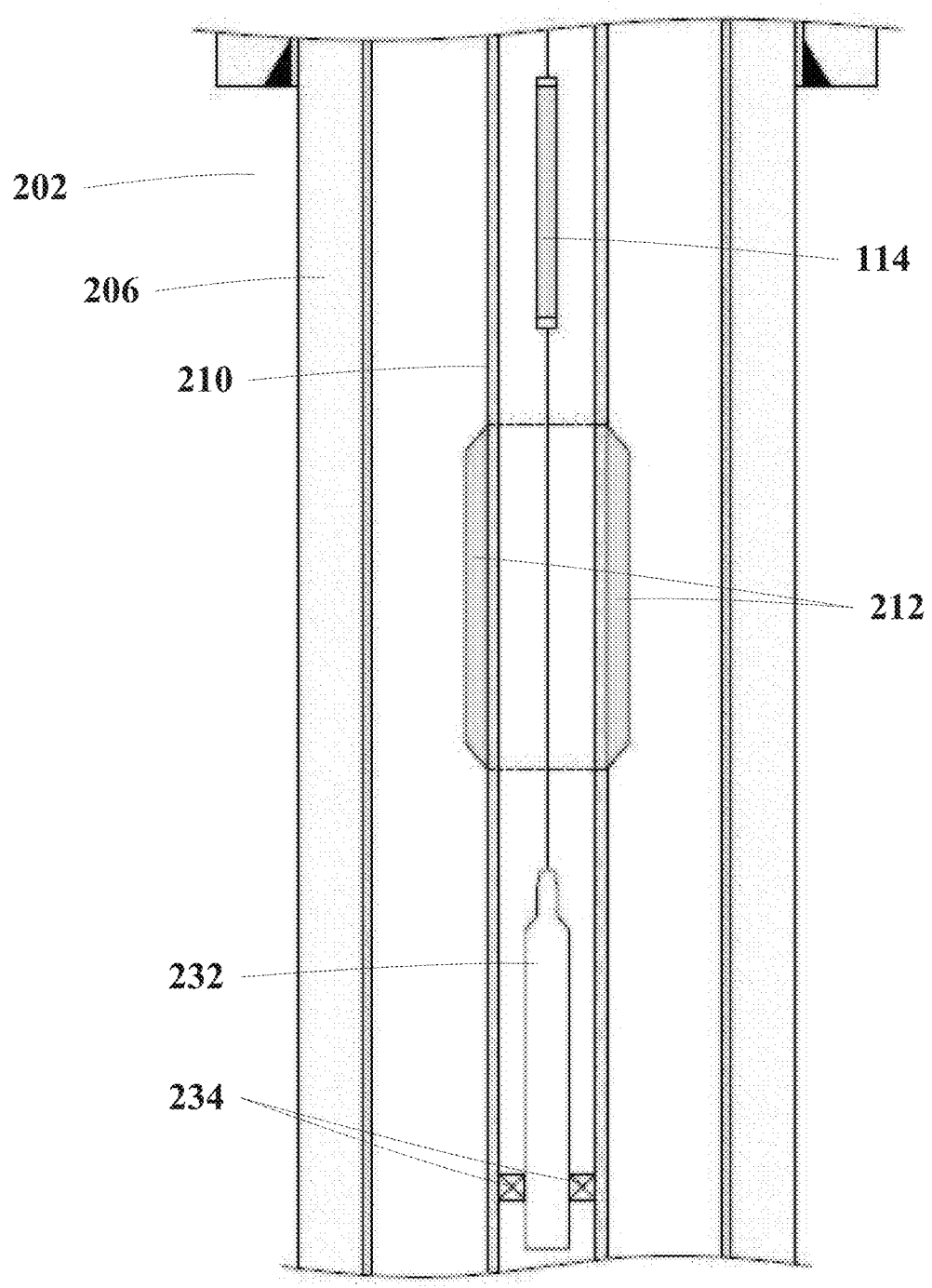
FIG. 3B displays a partial cross-section view of the well in accordance with embodiments.

FIG. 3B displays a partial cross-section view of the well 202 in accordance with embodiments. The well 202 may comprise an inner well casing 206 comprising an interior surface and an exterior surface. A cement layer may exist adjacent the exterior surface of the surface casing 221. A well tubing 210 found within the casing may comprise an interior surface and an exterior surface. At least a portion of the exterior surface of the well tubing 210 may comprise a well tubing coating 212 (as found in FIG. 2) comprising zinc, aluminum, lead, iron, copper, and cadmium. At least one coated sucker rod 214 may extend within said well tubing 210. The at least one coated sucker rod 214 may be affixed to a pump jack 204 at the surface of the earth. A portion of at least one coated sucker rod 214 may comprise a first end 150, a second end 160, a carbon steel core 112, and the sucker rod coating 114 adjacent a portion of the surface of the core 112. A rod pump 232 may be affixed to the bottom portion of the length of sucker rod(s)214. The rod pump 232 may move relative to the length of sucker rod(s) 214 and may assist in pumping (to the surface) liquids and/or gases trapped in the ground. In embodiments, a tubing anchor 234 may be positioned at an area around the rod pump 232 and within the inner well casing 206. The tubing anchor 234 may prevent the tubing 210 from shifting, elongating, etc.

The disclosure may further provide a system for artificial lift. The artificial lift may comprise one or more components of the aforementioned system. The artificial lift may comprise a means of removing hydrocarbons from underneath the surface of the earth.

In embodiments, the system may comprise a well casing 206 comprising an interior surface and an exterior surface. The system may further provide a well tubing 210 comprising an interior surface and an exterior surface, wherein at least a portion of the exterior surface of the well tubing 210 may comprise a well tubing coating 212 comprising zinc, aluminum, lead, iron, copper, and cadmium. The system may further comprise at least one sucker rod 214 extending within said well tubing, wherein the at least one sucker rod may be affixed to a pump jack 204 at the surface of the earth. In embodiments, the at least one sucker rod 214 comprises a first end 150, a second end 160, a carbon steel core 112, and the sucker rod coating 114 adjacent a portion of the surface of the steel core 112. The system may further comprise an interface between the steel core 112 and the sucker rod coating 114, wherein the interface may be a product of molding a predetermined mixture of the sucker rod coating 114 in a predetermined volume to the carbon steel core 112. In embodiments, the thickness of the sucker rod coating 114 may be between 0.4375 inches and 0.5625 inches.

The disclosure may further provide a method for artificial lift. The method may comprise supporting in a inner well casing 206 a number of components. One component may be a well tubing 210 comprising an interior surface and an exterior surface. In embodiments, at least a portion of the exterior surface of the well tubing 210 may comprise a well tubing coating 212 comprising zinc, aluminum, lead, iron, copper, and cadmium. Another component may be at least one coated sucker rod 214 that may extend within the well tubing 210. The at least one coated sucker rod 214 may be affixed to a pump jack 204 at the surface of the earth. The at least one coated sucker rod 214 may comprise a first end 150, a second end 160, a carbon steel core 112, and the sucker rod coating 114 of zinc, aluminum, lead, iron, copper, and cadmium adjacent a portion of the surface of the steel core 112. The method may further comprise powering the pump jack 204 so as to actuate the at least one coated sucker rod 214 and allow the displacement of underground fluid. In embodiments, throughout one or more steps of the method, the well tubing coating 212 of the well tubing 210 and the sucker rod coating 114 of the sucker rod 214 may protect the sucker rod 214, the interior surface of the tubing 210, the exterior surface of the tubing 210, and the interior surface of the casing 206 from electrochemical corrosion during the displacement of the underground fluid.

In embodiments, one or both of the sucker rod coating 114 and well tubing coating 212 may comprise 99.414 to 99.859% by weight of zinc. In embodiments, one or both of the sucker rod coating 114 and well tubing coating 212 may comprise 0.1 to 0.5% by weight of aluminum. In embodiments, one or both of the sucker rod coating 114 and well tubing coating 212 may comprise 0.006% by weight of lead. In embodiments, one or both of the sucker rod coating 114 and well tubing coating 212 may comprise 0.005% by weight of iron. In embodiments, one or both of the sucker rod coating 114 and well tubing coating 212 may comprise 0.005% by weight of copper. In embodiments, one or both of the sucker rod coating 114 and well tubing coating 212 may comprise 0.025 to 0.07% by weight of cadmium. In embodiments, one or both of the sucker rod coating 114 and well tubing coating 212 may comprise greater than 99.414% by weight of zinc. In embodiments, one or both of the sucker rod coating 114 and well tubing coating 212 may comprise greater than 99.859% by weight of zinc. In embodiments, one or both of the sucker rod coating 114 and well tubing coating 212 may comprise less than 0.005% by weight of iron. In embodiments, one or both of the sucker rod coating 114 and well tubing coating 212 may comprise less than 0.006% by weight of lead. In embodiments, one or both of the sucker rod coating 114 and well tubing coating 212 may comprise less than 0.005% by weight of copper.

In embodiments, one or both of the sucker rod coating 114 and well tubing coating 212 may comprise 99.9856% by weight of zinc. In embodiments, one or both of the sucker rod coating 114 and well tubing coating 212 may comprise 0.005% by weight of aluminum. In embodiments, one or both of the sucker rod coating 114 and well tubing coating 212 may comprise 0.003% by weight of lead. In embodiments, one or both of the sucker rod coating 114 and well tubing coating 212 may comprise 0.0014% by weight of iron. In embodiments, one or both of the sucker rod coating 114 and well tubing coating 212 may comprise 0.002% by weight of copper. In embodiments, one or both of the sucker rod coating 114 and well tubing coating 212 may comprise 0.003% by weight of cadmium. In embodiments, one or both of the sucker rod coating 114 and well tubing coating 212 may comprise more than 99.9856% by weight of zinc. In embodiments, one or both of the sucker rod coating 114 and well tubing coating 212 may comprise less than 0.0014% by weight of iron. In embodiments, one or both of the sucker rod coating 114 and well tubing coating 212 may comprise less than 0.003% by weight of lead. In embodiments, one or both of the sucker rod coating 114 and well tubing coating 212 may comprise less than 0.002% by weight of copper. In embodiments, one or both of the sucker rod coating 114 and well tubing coating 212 may comprise less than 0.005% by weight of aluminum. In embodiments, one or both of the sucker rod coating 114 and well tubing coating 212 may comprise less than 0.003% by weight of cadmium.

Each of the metals in the sucker rod coating 114 and the well tubing coating 212 may protect the apparatus 100, the interior surface of the tubing 210, the exterior surface of the tubing 210, and the interior surface of the casing 206 from electrochemical corrosion in environments highly concentrated with radical elements such as, but not limited to, wells. The radical elements may chemically degrade the apparatus 100, the interior surface of the tubing 210, the exterior surface of the tubing 210, and the interior surface of the casing 206 if a sucker rod coating 114 and/or well tubing coating 212 are not in a vicinity of any of the above mentioned surfaces of components. In embodiments, the zinc in the sucker rod coating 114 and/or well tubing coating 212 may protect the surfaces from H2S. In embodiments, the cadmium in the sucker rod coating 114 and/or well tubing coating 212 may protect the surfaces from CO2. In embodiments, the aluminum in the sucker rod coating 114 and/or well tubing coating 212 may protect the surfaces from chlorides and salts. In embodiments, a sucker rod coating 114 on the apparatus 100 may protect the apparatus 100 as well as the interior surface of the tubing 210. In embodiments, a well tubing coating 212 on at least a portion of the exterior surface of the tubing 210 may protect the exterior surface of the tubing 210 as well as the interior surface of the casing 206.

In embodiments, a portion of a sucker rod 214 with a sucker rod coating 114 may be placed at 500 feet in depth as part of a longer section of a sucker rod 214 in a well 202.

In embodiments, the first and second ends 150,160 of the apparatus 100 may each comprise an internal conical cavity.

In embodiments, a sucker rod 214 and/or pony rod may not be limited by a specific length and may be any length to sufficiently carry out its duty in a well, oil/natural gas system, etc. In embodiments, one or more sucker rods 214 and/or one or more pony rods may be incorporated into a well, oil/natural gas system, etc., such as the system shown in FIG. 3A.

In embodiments, the sucker rod coating 114 may span on any single apparatus 100, sucker rod 214, and/or pony rod (with two arc transition zones on opposite ends) from arc transition zone to arc transition zone. In embodiments, the sucker rod coating 114 may span a distance of 14 inches. In embodiments, the sucker rod coating 114 may span a distance of 14.375 inches.

In embodiments, a sucker rod coating 114 and/or a well tubing coating 212 may be strategically placed in more than one distance within the well 202 (such as in FIG. 3A). This may provide sufficient protection for certain lengths of the well 202 from chemical erosion.

In embodiments, the thickness of the sucker rod coating 114 surrounding the apparatus 100 may range from 0.4375 inches to 0.5625 inches. This thickness may allow for efficient and improved electron transfer ability between the sucker rod coating 114 and the apparatus 100. Unlike thicker coatings, sucker rod coating 114 may provide less resistance than thicker coatings. In order to apply the sucker rod coating 114 to the apparatus 100, the surface of the steel core may be sand blasted, primed, and/or galvanized prior to application of the sucker rod coating 114. The steel core may then be placed within the confines of a mold. The mold may be filled with the sucker rod coating 114 in a heated liquid form and may be left to cool in order to create a sufficient interface between the steel core and the sucker rod coating 114. The interface between the steel core of the apparatus 100 and the sucker rod coating 114 may comprise efficient electron transfer abilities.

In embodiments, a predetermined volume of a predetermined mixture of the sucker rod coating 114 may be molded within a mold to form an efficient electron transfer interface between an apparatus 100 and a sucker rod coating 114.

In embodiments, the thickness of the well tubing coating 212 surrounding the tubing 210 may be 1.25 inches. This thickness may allow for efficient and improved electron transfer ability between the well tubing coating 212 and the tubing 210. Unlike thicker coatings, well tubing coating 212 may provide less resistance than thicker coatings. In order to apply the well tubing coating 212 to the tubing 210, the surface of the tubing 210 may be sand blasted, primed, and/or galvanized prior to application of the well tubing coating 212. The tubing 210 may then be placed within the confines of a mold. The mold may be filled with the well tubing coating 212 in a heated liquid form and may be left to cool in order to create a sufficient interface between the tubing 210 and the well tubing coating 212. The interface between the tubing 210 and the well tubing coating 212 may comprise efficient electron transfer abilities.

In embodiments, a predetermined volume of a predetermined mixture of the well tubing coating 212 may be molded within a mold to form an efficient electron transfer interface between a tubing 210 and a well tubing coating 212.

In embodiments, an anode may be preformed to fit around a portion of a sucker rod and/or apparatus 100. The anode may be preformed by any sufficient and/or appropriate method. In embodiments, the preformed anode may comprise a combination of zinc, aluminum, lead, iron, copper, and cadmium in any percentage combination disclosed.

In embodiments, the sucker rod coating 114 and/or the well tubing coating 212 is not electroplated.

In embodiments, the sucker rod coating 114 and/or the well tubing coating 212 may allow for more flexibility of the apparatus 100 and/or the tubing 210 due to the thickness of the sucker rod coating 114 and/or the well tubing coating 212.

In embodiments, the sucker rod coating 114 and well tubing coating 212 may comprise the same compositions of metals. In embodiments, the sucker rod coating 114 and well tubing coating 212 may comprise different compositions of metals.

In embodiments, the sucker rod coating 114 and well tubing coating 212 may comprise the same thickness. In embodiments, the sucker rod coating 114 and well tubing coating 212 may comprise different thicknesses.

In embodiments, the apparatus 100, sucker rod 214, pony rod, and/or well tubing 210 may be prepped by a blasting means other than sand blasting. In embodiments, the apparatus 100, sucker rod 214, pony rod, and/or well tubing 210 may be prepped by abrasive blasting.

While this disclosure has been particularly shown and described with reference to preferred embodiments thereof and to the accompanying drawings, it will be understood by those skilled in the art that various changes in form and details may be made therein without departing from the spirit of this disclosure. Therefore, the scope of the disclosure is defined not by the detailed description but by the appended claims.

The invention claimed is:

1. A sucker rod system for associating with a production tubing within a production casing of a hydrocarbon production well and having a high corrosion resistance for use in extending the life of a production tubing string and extending time between well work overs for a late life hydrocarbon production well, the well having a high radical concentration fluid environment, the sucker rod system comprising:
a plurality of solid sucker rod anodes for positioning within the production tubing for protecting the interior wall of the production tubing from electrochemical corrosion, each of the plurality of solid sucker rod anodes comprising
a carbon steel core having an outer surface extending from a first end to a second end, the outer surface comprising: carbon steel disposed to contact fluid in the hydrocarbon production well, and further comprising an anode coating adjacent the outer surface of the carbon steel core and molded onto said each of the plurality solid sucker rod anodes, ; and
a plurality of anode coatings molded around selected portions of the production tubing for protecting the exterior wall of the production tubing and the interior of the production casing from electrochemical corrosion, each of said plurality of anode coatings molded around selected portions of the production tubing for contacting the hydrocarbon production well fluid;
anode coating on said solid sucker rod anodes and anode coatings molded around selected portions of the production tubing formed of a composition comprising zinc in a proportion of at least 99.414% by weight for protecting said production tubing and said production casing from H2S, aluminium in a proportion of 0.1% to 0.5% by weight for protecting said production tubing and said production casing from chlorine and salt, and cadmium in a proportion of 0.025% to 0.070% by weight for protecting said production tubing and said production casing from CO2 corrosion, thereby extending the life of the production tubing and production casing in a later life hydrocarbon production well by reducing the electrochemical corrosion from H2S, chlorine and salt, and CO2.

2. The apparatus of claim 1, wherein said sucker rod system comprises a carbon steel core further comprising a width ranging from ⅞inches and ¾inches in width.

3. The apparatus of claim 1, wherein said sucker rod system comprises an anode coating further comprising an outer diameter between 1.625 inches and 2 inches in width.

4. The apparatus of claim 1, wherein said anode coating further comprises not more than 99.414% by weight of zinc.

5. The apparatus of claim 1, wherein said anode coating further comprises not more than 0.006% by weight of lead.

6. The apparatus of claim 1, wherein said anode coating further comprises not more than 0.005% by weight of iron.

7. The apparatus of claim 1, wherein said anode coating further comprises not more than 0.005% by weight of copper.

8. The apparatus of claim 1, wherein said carbon steel core is sand blasted and galvanized prior to being coated.

9. A well for the production of hydrocarbons wherein a sucker rod system associates with production tubing within a production casing of a hydrocarbon production well and having a high corrosion resistance for use in extending the life of a production tubing string and extending time between well work overs for a late life hydrocarbon production well, the well having a high radical concentration fluid environment, comprising:
  a well casing comprising an interior surface and an exterior surface;
  a well tubing comprising an interior surface and an exterior surface, wherein at least a portion of the exterior surface of the well tubing comprises a well tubing coating comprising zinc, aluminum, and cadmium;
  the sucker rod system comprising:
    a plurality of solid sucker rod anodes for positioning within the production tubing for protecting the interior wall of the production tubing from electrochemical corrosion, and comprising a carbon steel core having an outer surface extending from a first end to a second end, the outer surface comprising carbon steel disposed to contact the fluid in the hydrocarbon production well, and further comprising an anode coating adjacent the outer surface of the carbon steel core and molded onto said solid sucker rod anode, ; and
    a plurality of anode coatings molded around selected portions of the production tubing for protecting the exterior wall of the production tubing and the interior of the production casing from electrochemical corrosion, each of said plurality of anode coatings molded around selected portions of the production tubing for contacting the hydrocarbon production well fluid;
    said the anode coating on said solid sucker rod anodes and anode coatings molded around selected portions of the production tubing formed of a composition comprising zinc in a proportion of at least 99.414% by weight for protecting said production tubing and said production casing from H2S, aluminium in a proportion of 0.1% to 0.5% by weight for protecting said production tubing and said production casing from chlorine and salt, and cadmium in a proportion of 0.025% to 0.070% by weight for protecting said production tubing and said production casing from CO2 corrosion, thereby extending the life of the production tubing and production casing in a later life hydrocarbon production well by reducing the electrochemical corrosion from H2S, chlorine and salt, and CO2.

10. The well of claim 9, wherein said sucker rod system comprises a carbon steel core comprising a diameter ranging between ⅞inches and ¾inches in width.

11. The well of claim 9, wherein said sucker rod system comprises an anode coating further comprising an outer diameter between 1.625 inches and 2 inches in width.

12. The well of claim 9, wherein said anode coating further comprising not more than 99.414% by weight of zinc.

13. The well of claim 9, wherein said anode coating further comprising 0.1 to 0.5% by weight of aluminum.

14. The well of claim 9, wherein said anode coating further comprising not more than 0.006% by weight of lead.

15. The well of claim 9, wherein said anode coating further comprising not more than 0.005% by weight of iron.

16. The well of claim 9, wherein said anode coating further comprising not more than 0.005% by weight of copper.

17. The well of claim 9, wherein said anode coating further comprising 0.025 to 0.07% by weight of cadmium.

18. The well of claim 9, wherein said carbon steel core is sand blasted and galvanized prior to being coated.

19. A system for artificial lift within a hydrocarbon production well, and wherein a sucker rod system associates with production tubing within a production casing of a hydrocarbon production well and demonstrates a high corrosion resistance for use in extending the life of a production tubing string and extending time between well work overs for a late life hydrocarbon production well, the system for artificial lift comprising:
  a production casing comprising an interior surface and an exterior surface;
  a production tubing comprising an interior surface and an exterior surface;
  a sucker rod system comprising:
    a plurality of solid sucker rod anodes for positioning within the production tubing for protecting the interior wall of the production tubing from electrochemical corrosion, and comprising a carbon steel core having an outer surface extending from a first end to a second end, the outer surface comprising carbon steel disposed to contact the fluid in the hydrocarbon production well, and further comprising an anode coating adjacent the outer surface of the carbon steel core and molded onto said solid sucker rod anode, ; and
    a plurality of anode coatings molded around selected portions of the production tubing for protecting the exterior wall of the production tubing and the interior of the production casing from electrochemical corrosion, each of said plurality of anode coatings molded around selected portions of the production tubing for contacting the hydrocarbon production well fluid;
    said the anode coating on said solid sucker rod anodes and anode coatings molded around selected portions of the production tubing formed of a composition comprising zinc in a proportion of at least 99.414% by weight for protecting said production tubing and said production casing from H2S, aluminium in a proportion of 0.1% to 0.5% by weight for protecting said production tubing and said production casing from chlorine and salt, and cadmium in a proportion of 0.025% to 0.070% by weight for protecting said production tubing and said production casing from $CO_2$ corrosion, thereby extending the life of the production tubing and production casing in a later life hydrocarbon production well by reducing the electrochemical corrosion from $H_2S$, chlorine and salt, and $CO_2$.

20. A method for artificial lift comprising supporting in a well casing the following:
  a well tubing comprising an interior surface and an exterior surface; and a sucker rod system for associating with a production tubing within a production casing of a hydrocarbon production well and having a high corrosion resistance for use in extending the life of a production tubing string and extending time between well work overs for a late life hydrocarbon production well, the well having a high radical concentration fluid environment, the sucker rod system comprising:

a plurality of solid sucker rod anodes for positioning within the production tubing for protecting the interior wall of the production tubing from electrochemical corrosion, and comprising a carbon steel core having an outer surface extending from a first end to a second end, the outer surface comprising carbon steel disposed to contact the fluid in the hydrocarbon production well, and further comprising an anode coating adjacent the outer surface of the carbon steel core and molded onto said solid sucker rod anode, ; and a plurality of anode coatings molded around selected portions of the production tubing for protecting the exterior wall of the production tubing and the interior of the production casing from electrochemical corrosion, each of said plurality of anode coatings molded around selected portions of the production tubing for contacting the hydrocarbon production well fluid;

said the anode coating on said solid sucker rod anodes and anode coatings molded around selected portions of the production tubing formed of a composition comprising zinc in a proportion of at least 99.414% by weight for protecting said production tubing and said production casing from $H_2S$, aluminium in a proportion of 0.1% to 0.5% by weight for protecting said production tubing and said production casing from chlorine and salt, and cadmium in a proportion of 0.025% to 0.070% by weight for protecting said production tubing and said production casing from CO2 corrosion, thereby extending the life of the production tubing and production casing in a later life hydrocarbon production well by reducing the electrochemical corrosion from $H_2S$, chlorine and salt, and $CO_2$;

and powering the pump jack so as to actuate the sucker rod system and allow the displacement of underground fluid, wherein the well tubing coating on the well tubing and the anode coating on the sucker rod system protect the sucker rod system, the interior surface of the tubing, the exterior surface of the tubing, and the interior surface of the casing from electrochemical corrosion during the displacement of the underground fluid.

* * * * *